Dec. 1, 1942.  M. A. BOSTWICK ET AL  2,303,429
PILOT-WIRE PROTECTIVE RELAYING APPARATUS
Original Filed June 13, 1939
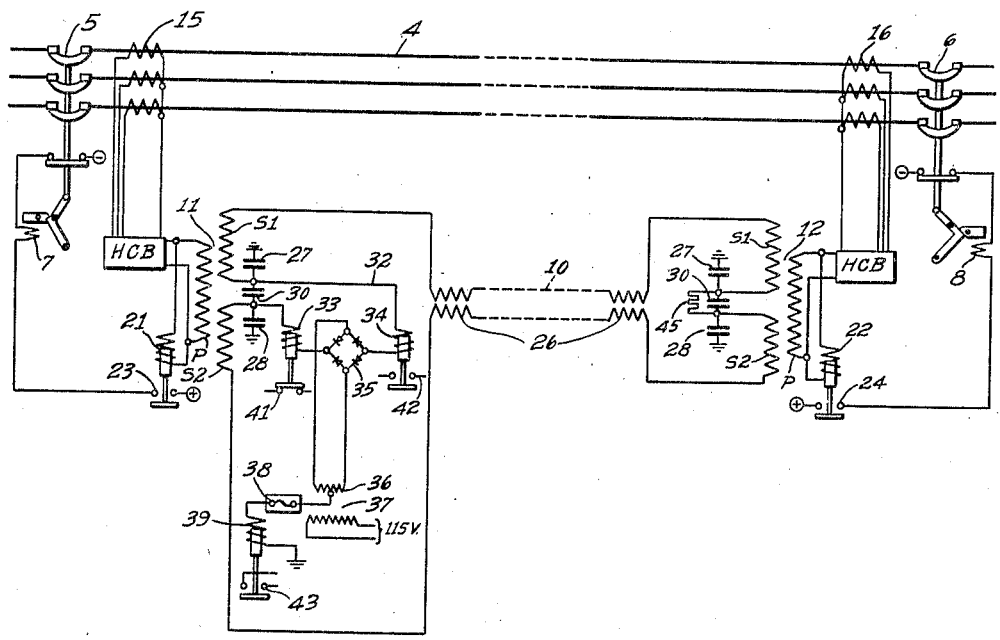
WITNESSES:
INVENTORS
Myron A. Bostwick
and Bert V. Hoard.
BY
ATTORNEY Patented Dec. 1, 1942

2,303,429

UNITED STATES PATENT OFFICE 2,303,429

PILOT-WIRE PROTECTIVE RELAYING APPARATUS

Myron A. Bostwick, Budd Lake, and Bert V. Hoard, Millburn, N. J., assignors to Westinghouse Electric & Manufacturing Company, East Pittsburgh, Pa., a corporation of Pennsylvania Original application June 13, 1939, Serial No. 278,845. Divided and this application May 20, 1941, Serial No. 394,282

6 Claims. (Cl. 171—97)

This application is a division of our Patent 2,276,150, granted March 10, 1942, on a division of our application Serial No. 278,845, filed June 13, 1939, for Pilot-wire supervision.

Our invention relates to the supervision of alternating-current pilot wires for the purpose of detecting all kinds of faults therein, as well as protecting the operators against high voltages which may be induced by inductive interference from parallel power-lines. Pilot-wire faults may consist of short-circuits or crossed wires, open circuits, or grounded conductors. The alternating-current pilot wires to which our invention particularly relates are such as are utilized in protecting a transmission-line against faults.

An object of our invention is to provide novel and effective means for giving the complete pilot-wire supervision just described, or any portion thereof.

A more specific object of our invention is to protect the pilot-wire of a line-fault-responsive relaying-system against high induced voltages in the pilot-wires, in a novel manner which will not provide a low-impedance by-pass or drainage-path for either the alternating-current in the pilot-wires, or the supervisory direct currents which are superimposed for the purpose of detecting the occurrence of a fault condition within the pilot-wire circuit.

With the foregoing and other objects in view, our invention consists in the combinations, systems, methods, circuits, and apparatus hereinafter described and claimed, and illustrated in the accompanying drawing, wherein the single figure is a simplified diagrammatic view of circuits and apparatus illustrating our invention in a form of embodiment in which complete protection is provided against overcurrents, undercurrents, groundcurrents, and induced currents, in the pilot-wires, with the electromagnetic relays illustrated in their deenergized positions, features which are unnecessary to an understanding of our invention being omitted for the sake of clearness.

Our invention is illustrated as being applicable to a circulating-current pilot-wire protective system for a three-phase transmission-line section 4, which is illustrated as terminating in circuit-breakers 5 and 6 having trip-coils 7 and 8 respectively.

Our invention is illustrated as being applied to the supervision of a double-wire pilot wire 10, the two ends of which are connected, through insulating transformers 11 and 12, respectively, to line-current-responsive voltage-producing means or networks, which we have indicated by rectangles marked HCB, at the respective ends of the protected transmission-line section 4, the two networks HCB being energized from two sets of line-current transformers 15 and 16 at the respective ends of the line-section, so that each of the networks HCB receives polyphase line-currents and supplies single-phase voltages to an end of the pilot wire 10. There are a number of networks known for answering our foregoing description of our HCB networks, and our invention is not limited to any particular network, although our invention is particularly designed for use with the network which is described and claimed in an application of E. L. Harder, Serial No. 183,044, filed January 3, 1938, Patent No. 2,183,646, granted December 19, 1939, for Relaying apparatus, assigned to the Westinghouse Electric & Manufacturing Company.

The insulating transformers 11 and 12 are not an essential, but in most practical cases would be utilized, both for the purpose of insulating the terminal equipment from any possible induced voltages which may appear in the pilot wire, and also for the purpose of providing a low-voltage primary winding P and a high-voltage secondary-winding S1 and S2, the latter being split into the two halves S1 and S2 and being connected to the two wires of the pilot wire 10, while the primary winding P is energized from the associated network HCB. As will subsequently be evident, the insulating transformers also provide a convenient and practical means for separating the alternating relaying current and the direct supervisory current which we utilize.

In the particular embodiments of our invention shown in the drawing, the terminal equipment at each end of the pilot wire 10 includes a line-protecting relay 21 and 22 at the respective ends, said relays having operating coils which are connected across the primary winding of the associated insulating transformer 11 or 12, as the case may be, and having make-contacts 23 and 24, respectively, which are utilized to energize the trip-coils 7 and 8, respectively, of the circuit breakers 5 and 6. While we have thus illustrated a simple overvoltage tripping relay 21 and 22 for responding linearly to the magnitudes of the voltages appearing across the respective primary windings P of the insulating transformers 11 and 12, it is to be distinctly understood that our invention is not limited to this particular sort of tripping relay, and that it may be applied to any known or subsequently invented forms of tripping relays, including those which are illustrated in the aforesaid Harder application.

The illustrated relaying system is a so-called circulating-current system in which currents are normally circulated in the pilot wire 10, under normal fault-free line-conditions, when the current which enters the line 4 at one end is the same as the current which leaves the line 4 at the other end. In this sort of system, the effective impedance of the pilot wire 10 must be small as compared to the effective internal impedances of the voltage-producing networks HCB which apply voltages to the ends of the pilot wire in response to the line-current at the respective ends of the line 4, so that, under the normal fault-free line-operating conditions, the pilot-wire voltage-drop, which appears in the respective primary windings P of the insulating transformers 11 and 12, will be too small to effectively energize the operating coils of the respective tripping relays 21 and 22. Such a system becomes inoperative in the event of crossed wires in the pilot-wire channel, because such crossed wires will prevent the primary winding P from ever having sufficient voltage to operate the tripping relays 21 or 22. An open circuit in the pilot-wire channel of such a system, accompanied by a current-flow above the setting of the relays 21 and 22, will inevitably result in a tripping operation, unless, as will subsequently be described, the open pilot-wire channel can be short-circuited, as by our supervisory means, within a time which is less than the time required for the operation of the respective tripping relays 21 and 22.

It is the particular object of our present invention to provide protection against induced currents in the pilot wires, by adding equipment, at each end of the pilot wire 10, comprising a neutralizing transformer 26, which serves as an equalizing reactor having two windings which are substantially non-inductive to equal currents flowing in opposite directions in the two wires of the pilot-wire channel 10, while imposing considerable impedance to the flow of induced currents, which would be flowing in the same direction in each of the two wires. In order to provide a path to ground, to make possible the flow of a small amount of these induced currents, sufficient to supply the magnetizing current necessary to cause the neutralizing transformer 26 to develop the necessary neutralizing or back-voltage, without providing a low-impedance by-pass or drainage-path for the circulating alternating current in the pilot wires, and without draining or grounding the supervisory direct currents which will subsequently be described, we also provide small drainage-capacitors 27 and 28, for grounding the inner ends of the split secondary windings S1 and S2 of the two insulating transformers 11 and 12. A somewhat different arrangement of the neutralizing transformer 26 and drainage capacitors 27 and 28 is described and claimed in the patent to C. Le G. Fortescue, No. 1,728,534, granted September 17, 1929, and assigned to the Westinghouse Electric & Manufacturing Company.

In the particular embodiment of our invention which is shown in the drawing, we also provide a novel type of pilot-wire supervisory system which is more specifically described and claimed in our parent application Serial No. 278,845, filed June 13, 1939, patented March 10, 1942, No. 2,276,150. The inner ends of the split secondary windings S1 and S2 of each of the insulating transformers 11 and 12 are joined by a relatively low-impedance alternating-current circuit including a capacitor 30 which is relatively large, so that its impedance is sufficiently small to keep the total effective pilot-wire impedance small, relative to the internal network-impedance, as previously described. In a practical embodiment of our invention, capacitors 30 of 10 microfarads capacity have been satisfactorily utilized, one at each end of the pilot wire, although we are not limited to any particular capacity.

In the preferred embodiments of our invention, the supervisory equipments at the two ends of the pilot wire 10 are different from each other, although our invention is not altogether limited to this feature, in some of its more generic aspects.

In the drawing, the supervisory equipment which is associated with the insulating transformer 11 comprises a direct-current circuit 32 of relatively high impedance, shunting the capacitor 30 which is connected between the two inner ends of the split secondary windings S1 and S2. This direct-current circuit 32 comprises the operating coil of a very sensitive under-voltage direct-current supervisory relay 33, the operating coil of a sensitive over-voltage direct-current supervisory relay 34, and a diagonal of a rectifier-bridge 35, the other diagonal of which is energized from the secondary winding 36 of a transformer 37, the midpoint of the secondary winding 36 being grounded through a high-voltage fuse 38 and the operating coil of a sensitive over-voltage direct-current supervisory relay 39. The under-voltage supervisory relay 33 has a back-contact 41, while the over-voltage supervisory relays 34 and 39 have front-contacts 42 and 43, respectively, and these relays are arranged so that their contacts 41, 42 and 43 are normally open, during normal pilot-wire conditions when there is no fault on the pilot-wire channel. The three relay-contacts 41, 42 and 43 are utilized to energize fault-detector or alarm-circuits, or to perform any other function which can be controlled by the closing of the relay-contacts.

In the drawing, the supervisory equipment at the other end of the pilot wire 10 is illustrated as comprising a relatively high-resistance direct-current circuit in the form of a resistor 45 shunting the capacity 30 which is connected between the inner ends of the split secondary windings S1 and S2 of the insulating transformer 12.

As a result of our use of a high resistance 45 in the direct-current circuit at the receiving end of the supervisory circuit, we obtain a definite increase in the direct-current signal when the pilot wire is shorted at said receiving end. Although our invention is obviously not limited to any particular size of the resistor 45, other than its resistance should preferably be quite large compared to the impedance of the pilot wire, we mention, by way of illustration, that we have successfully utilized a resistor 45 having a resistance of 8000 ohms, in conjunction with an over-voltage supervisory relay 34 which picks up, and closes its contact 42, at a current of something like 8 or 9 milliamperes, an under-voltage supervisory relay 33 which is normally energized by the normally circulating direct current of something like 6 milliamperes in the pilot wires 10, said under-voltage relay 33 dropping out at from 2 to 5 milliamperes so as to close its back-contact 41, and a pilot-wire ground-detector relay 39 which is similar to the over-voltage relay 34. It will thus be seen that there is another reason why the alternating-current impedance of the capacitors 30 should be small, in addition to avoiding the introduction of a high alternating-current impedance in the pilot-wire 10, because the alternating-current voltage-drop across the capacity 30 must be low enough not to come anywhere near operating either one of the direct-current supervisory relays 33 or 34.

In operation, it will readily be observed, from the foregoing description, that our supervisory system which is shown in the drawing will give protection against short-circuits or crossed wires in the pilot channel 10, by the picking up of the over-voltage supervisory relay 34, which responds to the increased flow of operating direct current in the pilot wires, under these conditions, said relay being sufficiently sensitive to detect shorts of 2000 ohms or less. In the event of a breakage of the pilot wire 10, resulting in an open-circuit condition in the pilot channel, the under-voltage supervisory relay 33 drops out and gives an indication by the closure of its back-contact 41. Ground-faults on either one of the pilot wires 10 result in the flow of current through the pilot-ground detector 39, giving an indication by the closure of its front-contact 43.

The high-voltage fuse 38, which is included in the direct-current grounding circuit in the drawing, is utilized to guard against the remote possibility of encountering simultaneously a pilot-wire ground-fault and considerable induction from the transmission-line 4, or from some other power-circuit running parallel to the pilot wire 10. Such a coincidence would subject the supervisory relays 33 and 39 or 34 and 39 to excessive ground-currents which might destroy the relays of said currents were permitted to flow for any appreciable time.

In operation, the circuit-connections, including the pilot wires 10, and the protective relays 21 and 22, serve as electrical-connection means for utilizing the pilot wire to totalize the derived alternating-current voltages which are delivered by the HCB networks at the respective ends of the protected line, said networks being energized responsively to the line-currents at said ends. The two serially connected capacitors 30, and the circuits shunted therearound, constitute means for detecting the presence of any kind of pilot-wire fault, whether crossed wires, an open-circuited wire, or a ground, this supervision being effected by means of a circulated direct current which is supplied by the rectifier 37, and which is circulated over the pilot-wire circuit.

In accordance with our invention, the neutralizing transformers 26 and the small drainage-capacitors 27 and 28 selectively operate so as to oppose incoming induced-voltage surges which are accompanied by line-frequency current-flow in the same direction in both of the pilot-wire conductors 10, while interposing a negligibly small impedance to the flow of circulating line-frequency currents which flow in opposite directions in the two pilot-wire conductors. The blocking of the induced-voltage surges, which are simultaneously induced in both of the pilot-wire conductors 10, is brought about by the development of a voltage-drop in the windings of the neutralizing transformer 26, at each end where such a transformer is provided.

In accordance with our invention, we have found it possible to secure this induced-voltage blocking in the neutralizing transformer 26 without material detriment to the circulating line-frequency currents which flow in opposite directions in the two conductors of a pilot wire, by making the grounded drainage-capacitors 27 and 28 so small, or of such a large impedance, that they will not by-pass any material proportion of the circulated line-frequency currents from the insulating transformers 11 and 12, or from their associated protective relays 21 and 22. In order for the neutralizing transformers 26 to develop the voltage-drop which serves to block out the incoming induced voltages from the terminal equipment at the end of the line, it is necessary to provide a ground-return path for these induced voltages; but we have discovered that it is only necessary, in this ground-return path, to circulate the magnetizing-current of the neutralizing transformer 26, and that it is feasible to design this neutralizing transformer so that its magnetizing current is quite small as compared to the circulating line-frequency currents which flow in opposite directions in the two conductors of the pilot wires 10. Our small grounding-capacitors 27 and 28, at the two ends of the pilot wire 10, are thus able to carry the magnetizing current of the neutralizing transformer 26 without an excessive voltage-drop in the grounding-capacitors 27 and 28, while the amount of circulated relay-current which is carried off by said grounding-capacitors 27 and 28 is so low as to be unobjectionable, from a relaying standpoint. As previously explained, the neutralizing transformer 26 interposes substantially no impedance to the flow of the relaying currents because of the mutual inductance between the two windings of the neutralizing transformer.

From the foregoing description, it will be understood that we have provided an adequate means for protecting the station-attendants or operators from induced voltages in the pilot wires, by producing suitable voltage-gradients in the neutralizing transformer 26, without materially impeding either the transmission-line-protective relaying-means which are associated with the pilot wires, or the supervisory equipment which detects faults within the pilot wires themselves.

We claim as our invention:

1. In combination, an electrical system including terminals, a pilot wire between said terminals, electrical-connection means at each end of the pilot wire for coupling an alternating-current electrical quantity over the pilot-wire, said electrical-connection means including insulating transformers at the respective ends of the pilot wire, each insulating transformer having a primary winding associated with the electrical-connection means and a split secondary winding connected across the associated end of the pilot wire, a neutralizing transformer having two mutually coupled windings connected in the respective pilot wires, and means including drainage-capacitors connecting the respective inner ends of the split secondary windings to ground at the respective ends of the pilot wires.

2. In combination, an electrical system including terminals, a pilot wire between said terminals, electrical-connection means at each end of the pilot wire for coupling an alternating-current electrical quantity over the pilot-wire, said electrical-connection means including insulating transformers at the respective ends of the pilot wire, each insulating transformer having a primary winding associated with the electrical-connection means and a split secondary winding connected across the associated end of the pilot wire, a neutralizing transformer having two mutually coupled windings connected in the respective pilot wires, a series impedance device connected in series between the split portions of said secondary winding at each end of the pilot wire, and a drainage-capacitor at each end of each series impedance device for connecting said end to ground.

3. A pilot wire, insulating transformers at the respective ends of the pilot wire, each insulating transformer having a primary winding and having a split secondary winding connected across the associated end of the pilot wire, a neutralizing transformer having two mutually coupled windings connected in the respective pilot wires, electric-circuit means connecting the inner ends of the respective split secondary windings, and means including drainage-capacitors connecting the respective inner ends of the split secondary windings to ground at the respective ends of the pilot wires.

4. A pilot wire, insulating transformers at the respective ends of the pilot wire, each insulating transformer having a primary winding and having a split secondary winding connected across the associated end of the pilot wire, a neutralizing transformer having two mutually coupled windings connected in the respective pilot wires, a series impedance device connected in series between the split portions of said secondary winding at each end of the pilot wire, and a drainage-capacitor at each end of each series impedance device for connecting said end to ground.

5. A signalling channel of extended length for signalling between terminals, comprising: wire-means for transmitting signalling alternating-current, said wire-means comprising a pair of pilot wires; insulating transformers at the respective ends of the pilot wires, each insulating transformer having a split secondary winding having its outer ends connected to the associated end of the pilot wires, and having a primary winding insulated from the split secondary winding; electrical equipment connected between the inner ends of the split secondary winding at at least one end of the pilot wires, said electrical equipment including means for completing a path for said signalling alternating-current, and other equipment as well; a neutralizing transformer having two mutually coupled windings connected in the respective pilot wires; and return-path-means connected at the inner ends of the split secondary winding at each end of the pilot wires for providing a return-path for the magnetizing current of the neutralizing transformer for induced currents flowing in the same direction in the two pilot wires.

6. The invention as defined in claim 5, characterized by said other equipment including means for circulating, and responding to, an auxiliary unidirectional current over the pilot wires, in addition to the signalling alternating-current, and said return-path-means including grounded capacitors connected to the respective inner ends of the split secondary windings at the aforesaid one end of the pilot wires.

MYRON A. BOSTWICK.
BERT V. HOARD.